(12) United States Patent
Inoue et al.

(10) Patent No.: US 8,516,911 B2
(45) Date of Patent: Aug. 27, 2013

(54) ULTRASONIC SENSOR MODULE ATTACHING DEVICE AND ATTACHING METHOD

(75) Inventors: Satoru Inoue, Tokyo (JP); Yukio Nishimoto, Tokyo (JP); Toru Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 186 days.

(21) Appl. No.: 13/256,139

(22) PCT Filed: Jun. 15, 2009

(86) PCT No.: PCT/JP2009/002700
§ 371 (c)(1),
(2), (4) Date: Sep. 12, 2011

(87) PCT Pub. No.: WO2010/146618
PCT Pub. Date: Dec. 23, 2010

(65) Prior Publication Data
US 2012/0000302 A1    Jan. 5, 2012

(51) Int. Cl.
*G01D 21/00* (2006.01)
*G08B 23/00* (2006.01)
(52) U.S. Cl.
USPC ..................................... 73/866.5; 340/693.9
(58) Field of Classification Search
USPC ............. 73/632, 866.5; 248/224.7; 293/117; 340/693.9; 361/807
See application file for complete search history.

(56) References Cited

U.S. PATENT DOCUMENTS

| 6,318,774 | B1 | 11/2001 | Karr et al. |
| 6,340,187 | B1 * | 1/2002 | Villiere et al. ................. 293/155 |
| 7,628,076 | B2 * | 12/2009 | Nakano et al. .................. 73/643 |
| 2003/0121331 | A1 * | 7/2003 | Mitsuoka et al. ............... 73/632 |
| 2006/0232081 | A1 | 10/2006 | Sato et al. |
| 2007/0163350 | A1 * | 7/2007 | Nakano et al. .................. 73/643 |

FOREIGN PATENT DOCUMENTS

| JP | 2006-298010 A | 11/2006 |
| JP | 2008-026231 A | 2/2008 |
| JP | 4056568 B2 | 3/2008 |
| WO | WO 98/52067 A2 | 11/1998 |

* cited by examiner

*Primary Examiner* — Hezron E Williams
*Assistant Examiner* — Nathaniel Kolb
(74) *Attorney, Agent, or Firm* — Birch, Stewart, Kolasch & Birch, LLP

(57) ABSTRACT

An ultrasonic sensor module attaching device and attaching method include an ultrasonic sensor module 1 having a flange 7 of which the diameter is larger than the hole diameter of a through hole 5 prepared through a bumper 4 of a vehicle; and a fixing ring plate 3 having an engaging section 3b with the flange of the ultrasonic sensor module temporarily fixed on the back of the bumper 4 and a large-diameter fixing section 3c which extends circumferentially of the engaging section and is fixed to the back of the bumper 4; thus, the necessity for positioning the fixing ring plate 3 to the hole 5 of the bumper 4 is eliminated, which can attach easily the ultrasonic sensor module 1 to the back of the bumper.

8 Claims, 9 Drawing Sheets (a)

(b)

ULTRASONIC SENSOR MODULE ATTACHING DEVICE AND ATTACHING METHOD

TECHNICAL FIELD

The present invention relates to an attaching device and an attaching method for attaching an ultrasonic sensor module to a bumper of a vehicle, for example.

BACKGROUND ART

Conventionally, for the attaching device and the attaching method of this kind, as shown in Patent Document 1, it is arranged that a holding section of an ultrasonic sensor module is disposed on the back of a bumper of a vehicle, the ultrasonic sensor module is housed in the holding section from the back of the bumper, and the surface of an assembly section of the ultrasonic sensor module that projects from the end face of the holding section is disposed to be flush with the surface of the bumper.

PRIOR ART DOCUMENTS

Patent Documents

Patent Document 1: Japanese Patent No. 4056568

However, in the arrangement disclosed in Patent Document 1, when a holding section of an ultrasonic sensor module is disposed on the back of a bumper of a vehicle, an alignment (jig) of the holding section is necessary for the hole of the bumper so that an assembly section of the ultrasonic sensor module to be housed in the holding section can be inserted into the hole of the bumper. Further, it is necessary to change the shape of the holding section coming in contact with the back of the bumper according to the shape of the back of the bumper. Moreover, in the case where the thickness of the bumper is changed, in order to arrange the surface of the assembly section of the ultrasonic sensor module to be flush with the surface of the bumper, there is a problem such that the change in the shape of a sleeve of the holding section is necessary.

The present invention has been made to solve the above-mentioned problems, and an object of the invention is to provide the following ultrasonic sensor module attaching device and attaching method: an alignment to the hole of a bumper is unnecessary, and the formation of a fixing ring plate in conformity with the shape of the bumper is unnecessary; the surface of the ultrasonic sensor module can be easily flush with that of the bumper without changing the shape thereof even if the bumper is changed in thickness.

SUMMARY OF THE INVENTION

An ultrasonic sensor module attaching device according to the present invention includes: an ultrasonic sensor module having a flange of which the diameter is larger than the hole diameter of a through hole prepared through a bumper of a vehicle; an interference preventing resilient body, interposed between the bumper of the vehicle and an assembly section of the ultrasonic sensor module that is located nearer to the end of the module than the flange thereof, for temporarily positioning the ultrasonic sensor module to the bumper; and a fixing ring plate having an engaging section that is assembled to the ultrasonic sensor module to engage with the flange, and a fixing section that extends more outwardly than the engaging section and is fixed to the back of the bumper.

The attaching device of the invention is arranged as discussed above, and thus the ultrasonic sensor module can be easily installed on the back of the bumper.

Further, an ultrasonic sensor module attaching method according to the invention includes: the steps of attaching an interference preventing resilient body to an assembly section of an ultrasonic sensor module as an assembly section to a bumper; inserting the assembly section into a hole of the bumper to temporarily position the assembly section in the hole with the interference preventing resilient body; assembling a fixing ring plate to the ultrasonic sensor module to engage an engaging section with a flange of the ultrasonic sensor module; and abutting and fixing the fixing section against the bumper with pressure.

The attaching method according to the invention follows the above-discussed attaching procedure; thus, the necessity of positioning the fixing ring plate to the hole of the bumper is eliminated, which facilitates the standardization of the ultrasonic sensor module and the fixing ring plate.

BRIEF DESCRIPTION OF THE DRAWINGS

FIG. 5(*a*) is a front view of a fixing ring plate, FIG. 5(*b*) is a front view showing a state where a halved fixing ring plate is opened with an ultrasonic sensor module detachably held, and FIG. 5(*c*) is a side view of a state where the halved fixing ring plate is opened.

FIG. 7(*a*) is a side view, and FIG. 7 (*b*) is a front view of an ultrasonic sensor module.

BEST MODE FOR CARRYING OUT THE INVENTION

Embodiments of the present invention will now be described with reference to the accompanying drawings in order to explain the present invention in more detail.

First Embodiment

Figure 1:
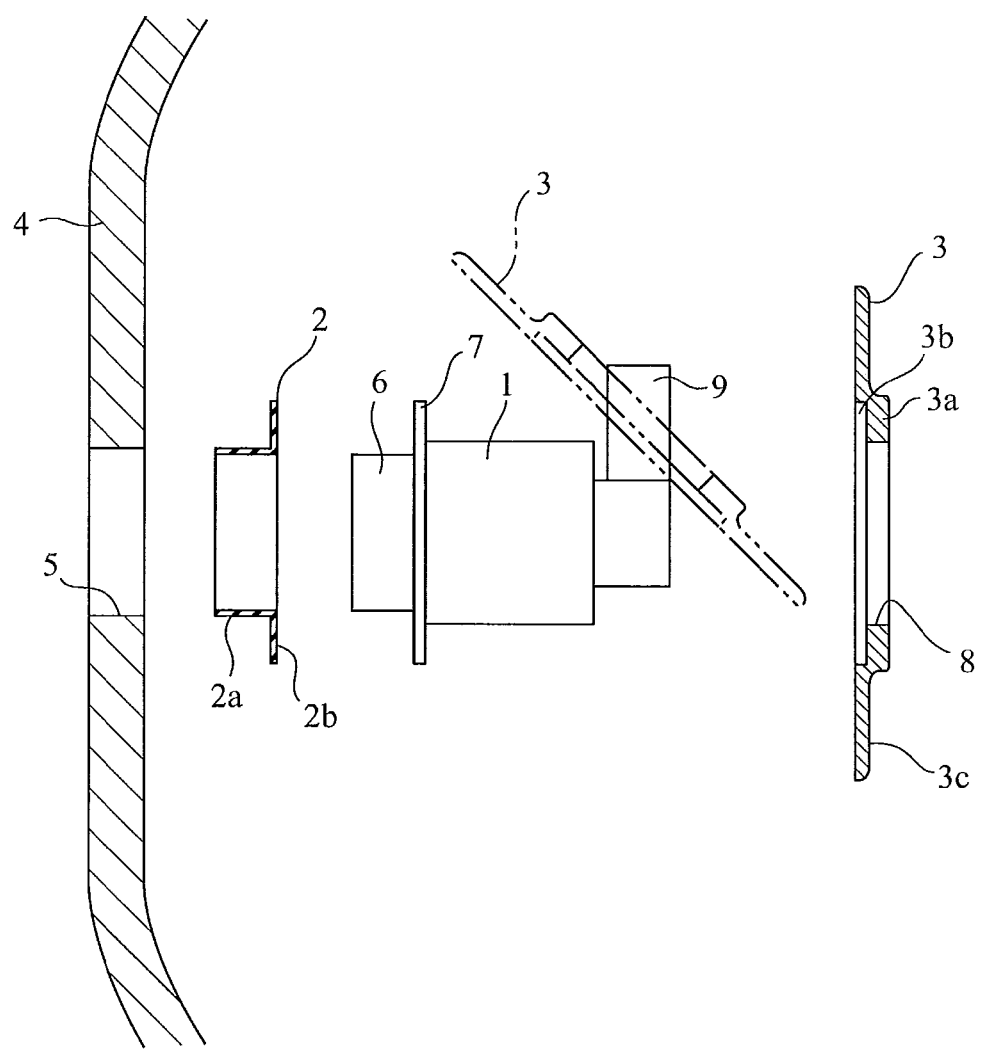
FIG. 1 is a side view of a state where constituent elements showing a first embodiment of the present invention are not yet assembled.
Figure 2:
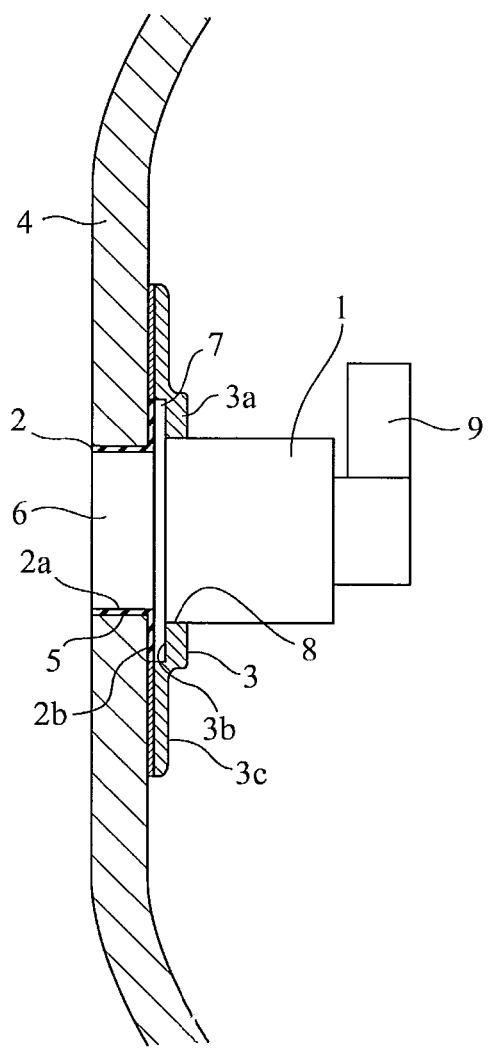
FIG. 2 is a side view showing a state where an ultrasonic sensor module is installed on a bumper of a vehicle.

In the following, an embodiment shown in the drawings will be described. FIG. 1 is a side view showing a state where constituent elements showing a first embodiment of the invention are not yet assembled, FIG. 2 is a side view showing a state where an ultrasonic sensor module is installed on a bumper of a vehicle. An attaching device according to the present invention has an ultrasonic sensor module 1, an interference preventing resilient body 2, and a fixing ring plate 3.

The ultrasonic sensor module 1 is formed in a shape where an assembly section 6 to a bumper 4 of a vehicle is insertion engaged with an attaching hole 5 formed through the bumper, and also a flange 7 having a diameter larger than that of the attaching hole 5 is formed at the base portion of the assembly section 6.

The interference preventing resilient body 2 is made of silicone rubber or the like, and has a tubular section 2a into which the assembly section 6 of the ultrasonic sensor module 1 is inserted and a flat section 2b for covering the surface of the flange 7 opposing the bumper 4.

Figure 4:
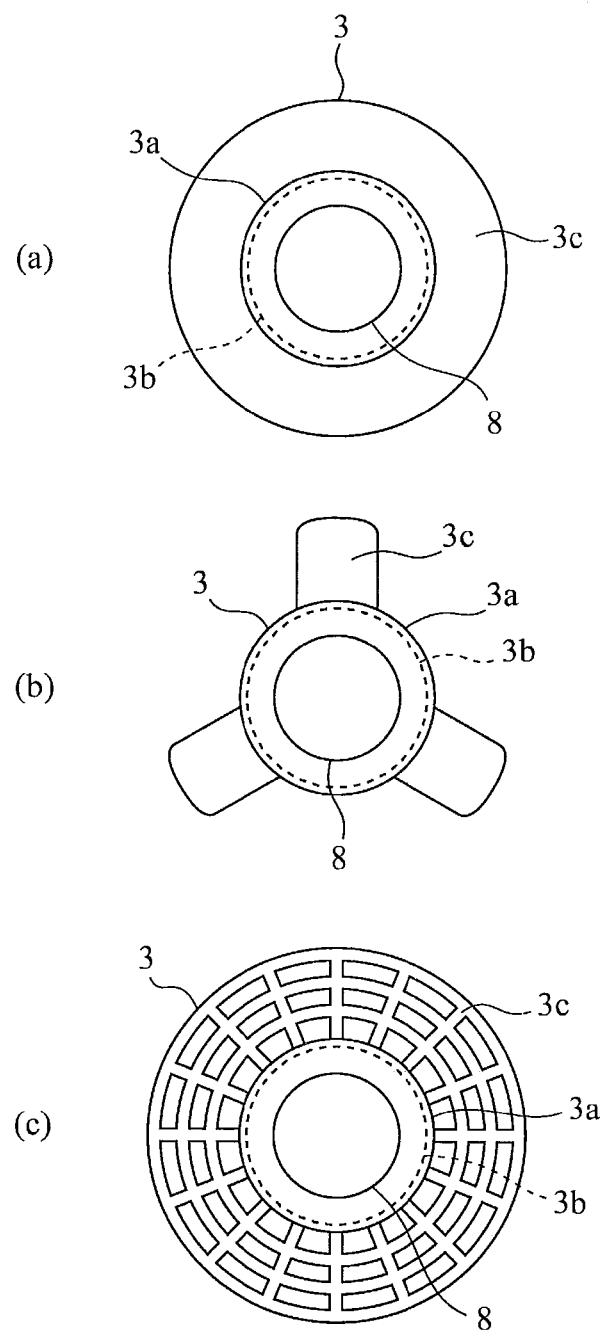
FIG. 4 is a front view showing the shapes of the fixing section of the fixing ring plate to the bumper of the vehicle.

A hole 8 for passing through the ultrasonic sensor module 1 is provided through a thick small-diameter section 3a at the center of the fixing ring plate 3; a concavity 3b for engaging with the flange 7 is provided at the thick small-diameter section 3a opposing the flange 7 of the ultrasonic sensor module 1; and a thin large-diameter fixing section 3c integrally formed is provided on the outer periphery of the thick small-diameter section 3a. The large-diameter fixing section 3c may be formed in a radial shape as shown in FIG. 4(b) and also in a mesh shape as shown in FIG. 4(c), in addition to a circular shape as shown in FIG. 4(a). Reference numeral 9 represents a connector provided at the rear end of the ultrasonic sensor module 1.

Next, an explanation will be given of a method of attaching the ultrasonic sensor module 1 to the bumper 4 of a vehicle. First, the assembly section 6 of the ultrasonic sensor module 1 is covered with the tubular section 2a of the interference preventing resilient body 2, and the surface of the flange 7 is covered with the flat section 2b formed integrally with one end of the tubular section 2a. Under such a condition, the assembly section 6 of the ultrasonic sensor module 1 is force-fitted into the attaching hole 5 of the bumper 4, and the ultrasonic sensor module 1 is temporarily positioned at the bumper 4 by the frictional force of the interference preventing resilient body 2.

Alternatively, the interference preventing resilient body 2 is inserted into the attaching hole 5 prepared through the bumper 4 to be temporarily fixed by the frictional force of the interference preventing resilient body 2. Thereafter, the assembly section 6 of the ultrasonic sensor module 1 is force-fitted into the interference preventing resilient body 2 temporarily fixed in the attaching hole 5 of the bumper 4, and thereby the ultrasonic sensor module 1 is temporarily positioned in the bumper 4 by the frictional force of the interference preventing resilient body 2.

Subsequently, the fixing ring plate 3 is inclined as shown by dash-double dot lines to pass the connector 9 through the hole 8 thereof and is assembled to the ultrasonic sensor module 1, then the fixing ring plate is moved toward the back of the bumper 4 perpendicularly to the ultrasonic sensor module 1 to engage the flange 7 with the concavity 3b, and the large-diameter fixing section 3c is pressed against the back of the bumper 4 to be fixed thereto with an adhesive 10. Such a fixing scheme may include welding, screw-fixing, and these combinations, in addition to the adhesion. In this case, even if the bumper 4 is curved, the large-diameter fixing section 3c is formed thinly with flexibility, and thus the fixing ring plate 3 can be easily conformed on the curved surface of the bumper 4 without changing the shape of the fixing ring plate according to the shape of the bumper, which enables to fix easily and strongly the fixing ring plate 3 on the back of the bumper 4. Incidentally, the flexibility of the large-diameter fixing section 3c can be formed of a flexible material of the large-diameter fixing section 3c, in addition to the above thin formation. In this connection, the thick small-diameter section 3a provided with the concavity 3b to be joined to the flange 7 is made of a material or structure harder than that of the large-diameter fixing section 3c.

Second Embodiment

Figure 3:
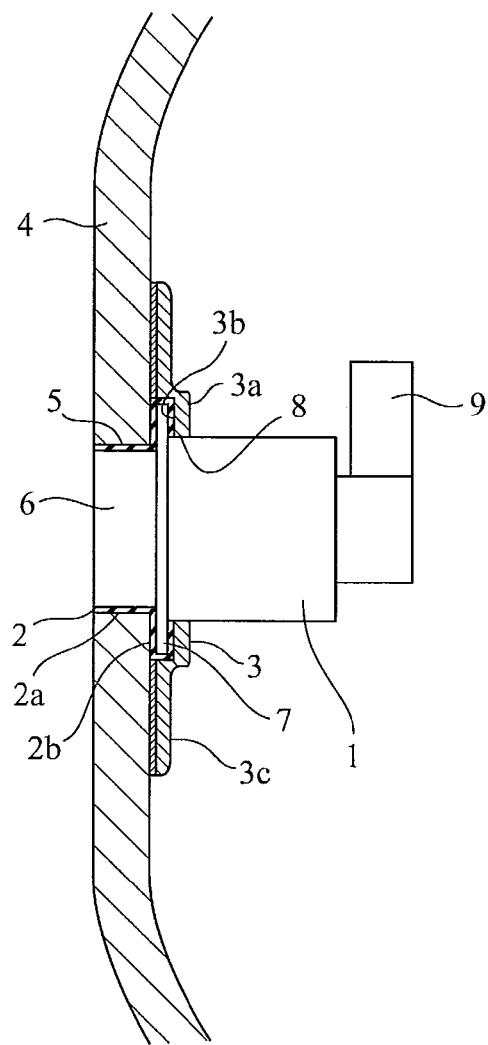
FIG. 3 is a side view showing a state where an ultrasonic sensor module is installed on a bumper of a vehicle according to a second embodiment of the invention.

In a second embodiment of the invention, as shown in FIG. 3, the flat section 2b of the interference preventing resilient body 2 in the first embodiment is formed larger, and the tip portion of the flat section 2b is turned to cover the flange 7 of the ultrasonic sensor module 1 to the back of the flange. Such an arrangement increases the effect of preventing interference between the ultrasonic sensor module 1 and the fixing ring plate 3 by virtue of the interference preventing resilient body 2 interposed therebetween. Further, the interference preventing resilient body 2 has a thickness thereof doubled as compared to that in the first embodiment, and thus, when the bumper 4 is changed in thickness, it is possible to easily absorb the thickness change due to the thickness of the interference preventing resilient body 2. Consequently, without changing the sizes and shapes of the ultrasonic sensor module 1 and the fixing ring plate 3, it is possible to perform an assembly such that the surface of the ultrasonic sensor module 1 is flush with that of the bumper.

Third Embodiment

Figure 5:
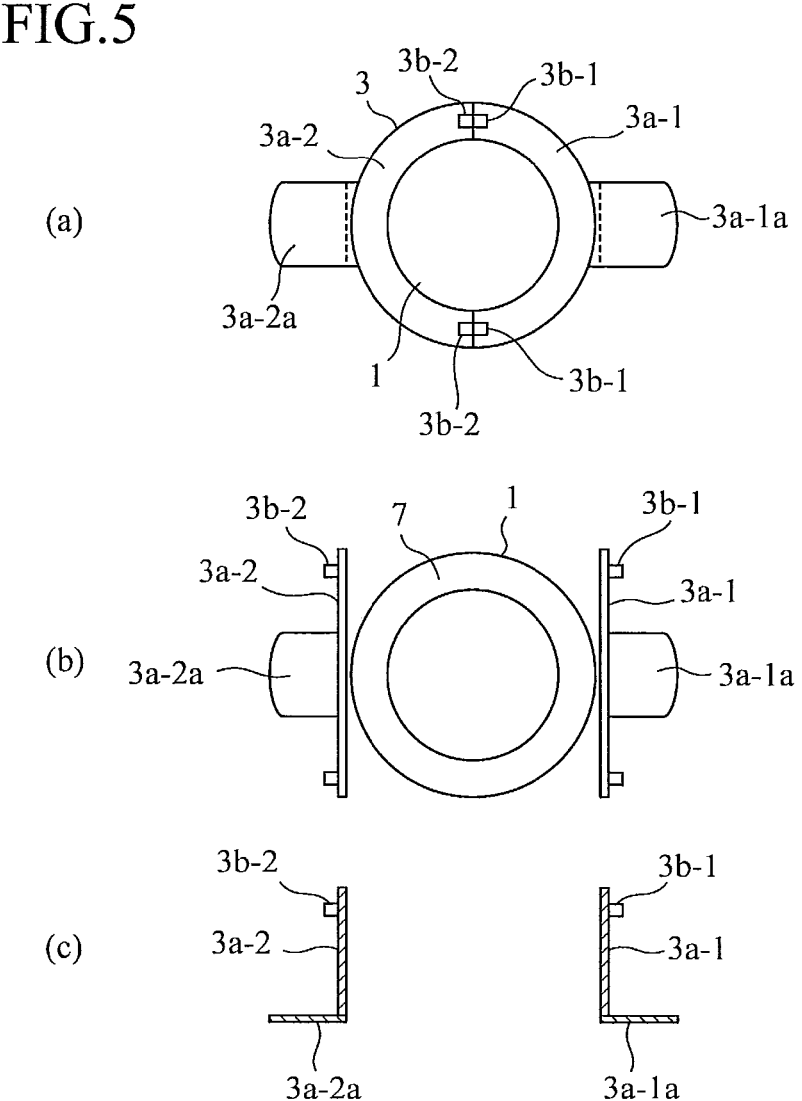
FIG. 5 shows a third embodiment of the invention.

In a third embodiment of the invention, the fixing ring plate 3 is halved as shown in FIG. 5(a), has connective fixing sections 3b-1, 3b-2 provided at the adjoining ends of halved bodies 3a-1, 3a-2 formed by halving, and further has fixing sections 3a-1a, 3a-2a outwardly extending to be flexibly (for example, dotted lines in the figure) provided on the central peripheral faces of the halved bodies 3a-1, 3a-2, respectively.

With such an arrangement, the ultrasonic sensor module 1 is temporarily positioned in the bumper 4 by the frictional force of the interference preventing resilient body 2 as in the first embodiment; under such a condition, the halved bodies 3a-1, 3a-2 obtained by division are assembled to the ultrasonic sensor module 1 from right and left so as to sandwich the sensor module therebetween, abutted against each other on the opening end faces thereof, and then the connective fixing sections 3b-1, 3b-2 are connected and fixed to each other with pawl-stopping snaps or slide snaps so as to maintain the state. Further, the fixing sections 3a-1a, 3a-2a provided on the central peripheral faces of the halved bodies 3a-1, 3a-2, respectively, are pressed against the back of the bumper 4 and fixed thereto with an adhesive 10.

Alternatively, an attachment in the similar procedure as that in the first embodiment is also possible with the fixing ring plate 3 connected with the connective fixing sections 3b-1, 3b-2.

According to the third embodiment, the fixing ring plate 3 is divided into two portions, the halved bodies 3a-1, 3a-2 thus divided by the two are connected and fixed to each other under a condition where the halved bodies sandwich the ultrasonic sensor module 1 therebetween from right and left, and the halved bodies are attached and fixed to the back of the bumper 4 with the fixing sections 3a-1a, 3a-2a flexibly provided on the central peripheral faces of the halved bodies 3a-1, 3a-2, respectively. Thus, upon replacing of the ultrasonic sensor module 1, the pawl-stopping snaps or the slide snaps serving as the connective fixing sections 3b-1, 3b-2 are unhooked to release the connection and fixation between the halved bodies as shown in FIG. 5(b), and the halved bodies 3a-1, 3a-2 are turned substantially 90 degrees with respect to the fixing sections 3a-1a, 3a-2a, respectively. Thereby, it is possible to detach and substitute the ultrasonic sensor module 1 with the fixing ring plate 3 attached to the back of the bumper 4, as shown in FIG. 5(c).

Fourth Embodiment

Figure 6:
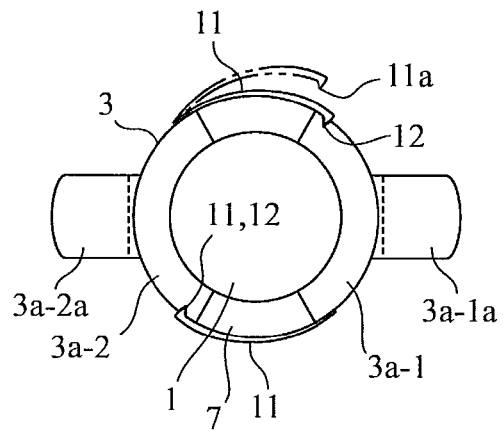
FIG. 6 is a front view showing a fourth embodiment of the invention.

FIG. 6 is a front view showing a fourth embodiment of the invention, a fixing ring plate 3 is divided into two portions, halved bodies 3a-1, 3a-2 thus divided by the two are formed in a half-circular shape to be pressed on the peripheral face of the ultrasonic sensor module 1, one of the opposing sections between the halved bodies 3a-1, 3a-2 is equipped with a binder 11 and the other thereof is prepared with a concavity 12 to be engaged with an engaging claw 11a at the tip of the binder.

With such an arrangement, under a condition where the ultrasonic sensor module 1 is temporarily positioned in the bumper 4 by the frictional force of the interference preventing resilient body 2 as in the first embodiment, the halved bodies 3a-1, 3a-2 obtained by dividing the fixing ring plate 3 into two portions are disposed so as to sandwich the ultrasonic sensor module 1 therebetween from right and left, the engaging claws 11a provided at the tips of the binders are engaged with the concavities 12 of the halved bodies 3a-1, 3a-2, respectively, to thereby assemble the fixing ring plate to the ultrasonic sensor module 1, and further, the fixing sections 3a-1a, 3a-2a provided on the central peripheral faces of the halved bodies 3a-1, 3a-2, respectively, are pressed against the back of the bumper 4 and fixed thereto with an adhesive 10, thus rendering a similar effect to that in the third embodiment.

Fifth Embodiment

Figure 7:
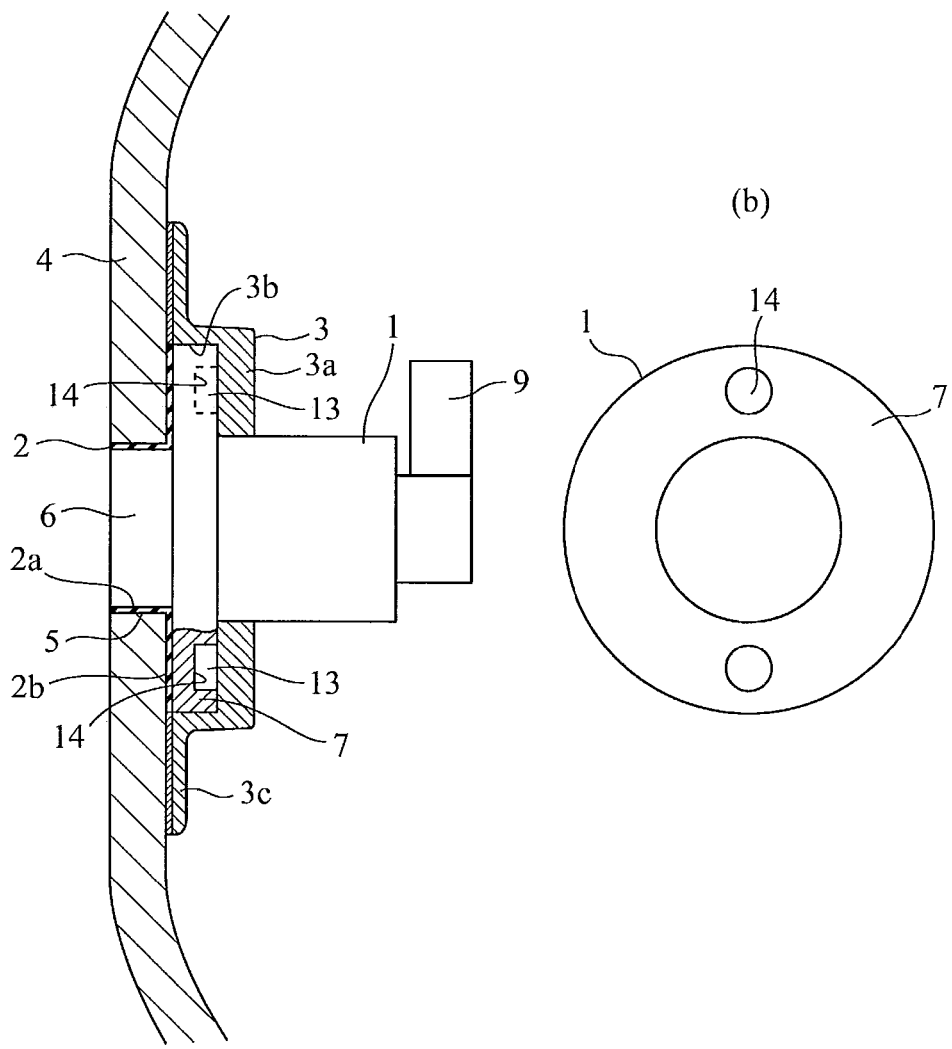
FIG. 7 shows a fifth embodiment of the invention.
Figure 8:
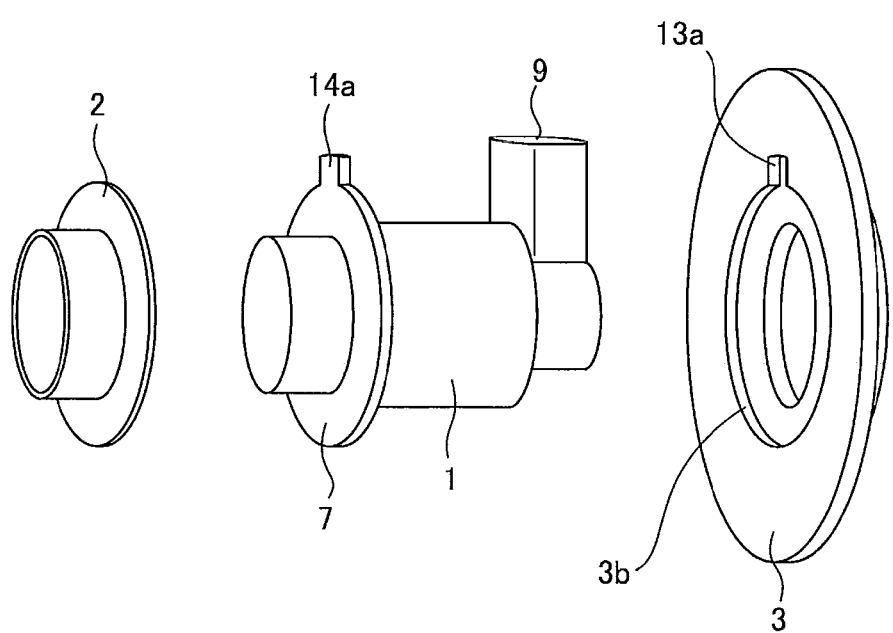
FIG. 8 is a side view showing a modification of the fifth embodiment of the invention, and showing a state where constituent elements are not yet assembled.

FIG. 7 shows a fifth embodiment of the invention: FIG. 7(a) is a side view, and FIG. 7(b) is a front view of an ultrasonic sensor module. In the fifth embodiment, one of the opposing faces between the flange 7 of the ultrasonic sensor module 1 and the concavity 3b of the fixing ring plate 3 engaging with the flange is provided with a pin 13, while the other thereof is provided with an engaging concavity 14. When the flange 7 is engaged with the concavity 3b, the pin 13 and the engaging concavity 14 are also engaged with each other. Further, as shown in FIG. 8, it is possible to provide an arrangement that the ultrasonic sensor module 1 have an engaging protrusion 14a provided at a portion of the peripheral face of the flange 7, and the fixing ring plate 13 have an engaging concavity 13a provided at a portion of the peripheral face of the concavity 3b thereof. Also, in the case of the fifth embodiment, an attachment is performed in the same procedure as that in the first embodiment.

With such an arrangement, an assembly direction is prescribed, which facilitates determining which side of the ultrasonic sensor module 1 is upside. Furthermore, a rotational displacement of the ultrasonic sensor module 1 after assembly can be positively prevented.

Sixth Embodiment

Figure 9:
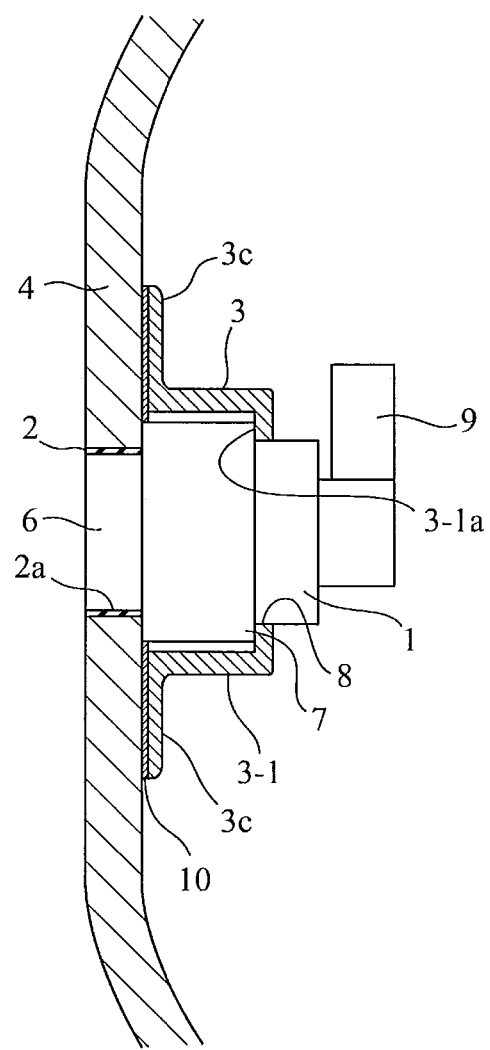
FIG. 9 is a side view showing a sixth embodiment of the invention.

FIG. 9 is a side view showing a sixth embodiment of the invention: a flange 7 is formed with extending from one side attached to a bumper to the other end side on the peripheral face of a ultrasonic sensor module 1, and a tubular section 3-1 is formed with extending from the one side attached to the bumper to the other end side in the fixing ring plate 3.

With such an arrangement, under a condition where the ultrasonic sensor module 1 is temporarily positioned in a bumper 4 by the frictional force of the interference preventing resilient body 2 as in the first embodiment, an end face plate 3-1a attached to one end of the tubular section 3-1 is engaged with the flange 7 to press the other end face of the flange against the bumper 4, and the large-diameter fixing section 3c of the fixing ring plate 3 is pressed against the back of the bumper 4 to be secured with an adhesive 10.

According to the sixth embodiment, the fixing ring plate 3 presses the flange 7 of the ultrasonic sensor module 1 thereagainst in a position remote from the back of the bumper, and thus the ultrasonic sensor module 1 is stably attached thereto and held, thereby enhancing vibration resistance thereof.

Seventh Embodiment

Figure 10:
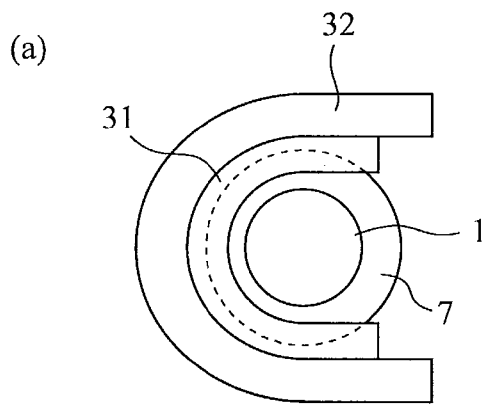
FIG. 10 is a front view showing a modification of a fixing ring plate.
Figure 10:
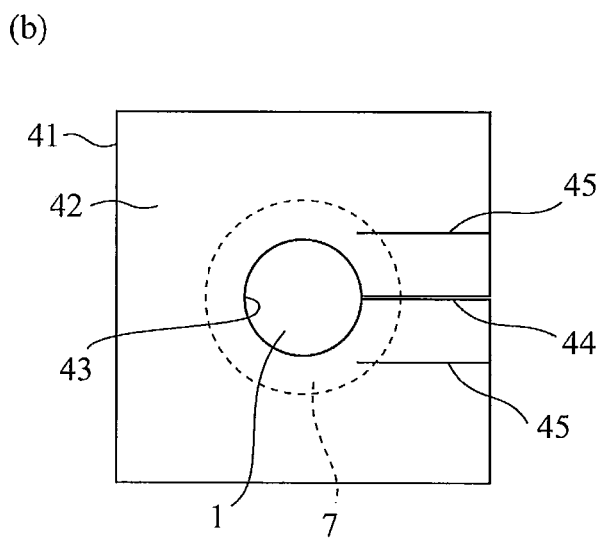

FIG. 10 illustrates a modification of a fixing ring plate showing a seventh embodiment of the invention: FIG. 10(a) shows an arrangement where a fixing ring plate 31 is formed in a U shape, the plate is assembled to an ultrasonic sensor module 1 from the side, and then a fixing section 32 is fixed to a bumper 4. Further, FIG. 10(b) shows an arrangement where a fixing ring plate 41 is formed in the shape of a flat plate, a hole 43 having a substantially same shape as the cross-sectional shape of the ultrasonic sensor module 1 is prepared in the center of a flat plate 42, a cut face 44 is prepared from the edge of the hole to the edge of the flat plate 42, and also a deformable flex line 45 is prepared parallel to the cut face 44 and on each side of the face. The ultrasonic sensor module 1 is assembled in the hole 43 while pressing and expanding the diameter of the hole 43 using the cut face 44 and the flex lines 45.

INDUSTRIAL APPLICABILITY

According to the present invention, after an ultrasonic sensor module is inserted in a hole of a bumper of a vehicle until a flange abuts against the bumper to thereby be temporarily positioned therein, under a condition where the flange is pressed against the back of the bumper by a fixing ring plate fitted around the ultrasonic sensor module, the ultrasonic sensor module is attached and fixed to the back of the bumper; thus, it is suitable for use in attaching an ultrasonic sensor module to a bumper of a vehicle of which the shape is unstable.

The invention claimed is:

1. An ultrasonic sensor module attaching device comprising:
    an ultrasonic sensor module having a flange of which the diameter is larger than the hole diameter of a through hole prepared through a bumper of a vehicle;
    a fixing ring plate having an engaging section for engaging with the flange of the ultrasonic sensor module that is temporarily positioned on the back of the bumper and a fixing section that extends circumferentially of the engaging section and abuts against the back of the bumper; and
    an interference preventing resilient body, which is interposed between the bumper of the vehicle and the ultrasonic sensor module to temporarily position the ultrasonic sensor module to the bumper, and which is changeable in thickness according to the thickness change of the bumper such that the front face of the ultrasonic sensor module is flush with the surface of the bumper.

2. The ultrasonic sensor module attaching device according to claim 1, wherein the fixing section of the fixing ring plate is comprised of a flexible material.

3. The ultrasonic sensor module attaching device according to claim 1, wherein the fixing ring plate is comprised of two pieces, each which has a fixing section comprised of flexible material, and a connection section is provided at the opposing ends of the two pieces to be connected with each other.

4. The ultrasonic sensor module attaching device according to claim 1, wherein concave and convex engaging sections for positioning are relatively prepared in the flange of the ultrasonic sensor module and at the bottom of the fixing ring plate for housing the flange.

5. The ultrasonic sensor module attaching device according to claim 1, wherein the ultrasonic sensor module has the flange extending from one bumper attaching side to the other end side, the fixing ring plate has a tubular section extending from the one bumper attaching side to the other end side, and the flange is pressed against the bumper by an end face plate attached to one end of the tubular section.

6. The ultrasonic sensor module attaching device according to claim 1, wherein the fixing ring plate is arranged to have one side that is opened in a U shape or provided with a flexible cut face.

7. An ultrasonic sensor module attaching method comprising the steps of:
   attaching an interference preventing resilient body to an assembly section of an ultrasonic sensor module;
   inserting the assembly section having the interference preventing resilient body attached thereto into a hole of a bumper to temporarily position the ultrasonic sensor module;
   assembling a fixing ring plate to the ultrasonic sensor module; and
   fixing a fixing section of the ultrasonic sensor module to the bumper while pressing the flange of the ultrasonic sensor module with the fixing ring plate.

8. An ultrasonic sensor module attaching method comprising the steps of:
   inserting an interference preventing resilient body into a hole of a bumper;
   inserting an assembly section of an ultrasonic sensor module to the bumper into the interference preventing resilient body to temporarily position the ultrasonic sensor module on the back of the bumper;
   assembling a fixing ring plate to the ultrasonic sensor module; and
   fixing a fixing section of the ultrasonic sensor module to the bumper while pressing the flange of the ultrasonic sensor module with the fixing ring plate.

* * * * *